United States Patent [19]

Masotti et al.

[11] 4,391,464
[45] Jul. 5, 1983

[54] BUMPER FOR MOTORVEHICLES AND THE LIKE, MADE OF PLASTIC MATERIALS, AND HAVING ITS CROSS SECTION CLOSED BY A REAR REINFORCING PART

[75] Inventors: Maurizio Masotti, Saronno; Antonio Zentile, Paderno Dugnano; Pasqualino Cau, Oggiono, all of Italy

[73] Assignee: Montedison S.p.A., Milan, Italy

[21] Appl. No.: 240,299

[22] Filed: Mar. 4, 1981

[30] Foreign Application Priority Data

Mar. 6, 1980 [IT] Italy .................. 20385 A/80

[51] Int. Cl.³ ............................................. B60R 19/00
[52] U.S. Cl. ..................................... 293/120; 293/121
[58] Field of Search ..................... 293/102, 120, 121

[56] References Cited

U.S. PATENT DOCUMENTS

| | | | |
|---|---|---|---|
| 2,910,033 | 10/1959 | Weisburg | 293/120 |
| 4,066,285 | 1/1978 | Hall | 293/120 |
| 4,268,079 | 5/1981 | Nomura | 293/120 |
| 4,325,574 | 4/1982 | Umemoto | 293/120 |

Primary Examiner—Joseph F. Peters, Jr.
Assistant Examiner—John A. Carroll
Attorney, Agent, or Firm—Stevens, Davis, Miller & Mosher

[57] ABSTRACT

The invention concerns a bumper or front piece for motorvehicles, consisting of a bumper or the like of an open cross-section, substantially C-shaped, closed on the rear in a removable way by a reinforcing plate or wall of varying thickness, consisting of a substantially straight lamina having at its opposite ends at least one enlargement radiused through a slanting plane to said lamina and being provided with suitable means for the steady anchoring of the whole reinforcing piece to the bumper itself, so as to obtain a reinforcing wall of such a shape or profile as to effectively oppose flectional and shearing stresses on the supports, said reinforcing wall having along its longitudinal edges elastic coupling means with suitable gains, with other means provided along the longitudinal edges of the bumper, so as to achieve a mechanical coupling capable of ensuring the solidarity between the jointed parts and contemporaneously to resist longitudinal tangential stresses.

6 Claims, 8 Drawing Figures

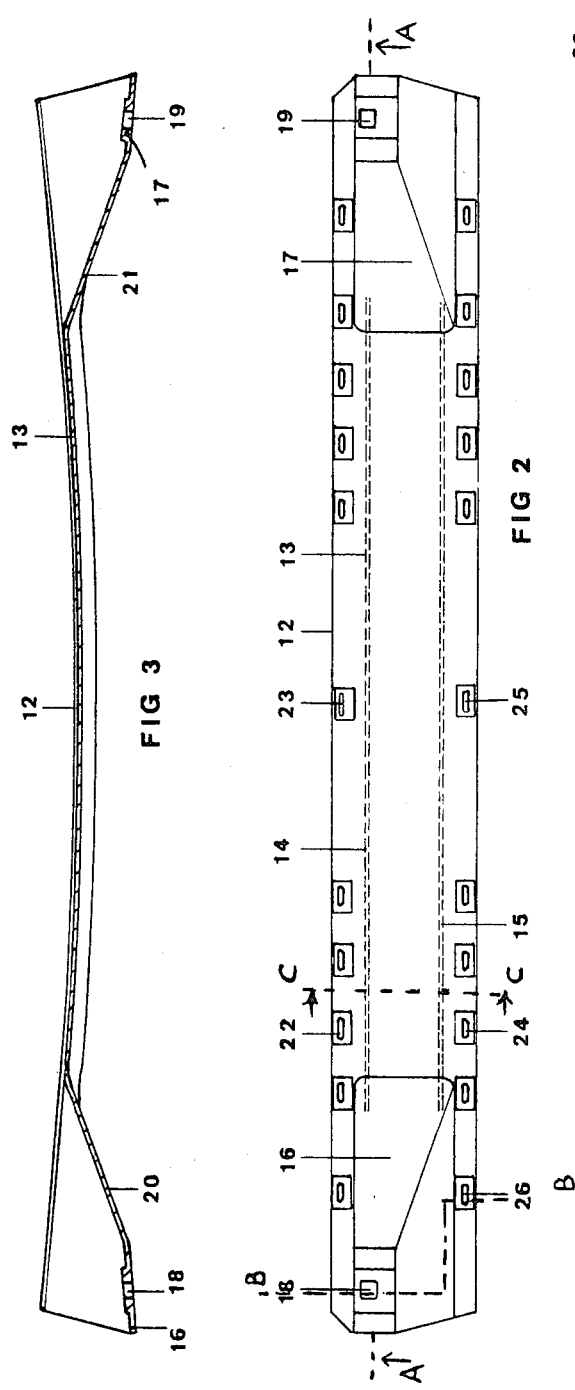

BUMPER FOR MOTORVEHICLES AND THE LIKE, MADE OF PLASTIC MATERIALS, AND HAVING ITS CROSS SECTION CLOSED BY A REAR REINFORCING PART

The present invention concerns a bumper, and more particularly it relates to a frontal piece also with the function of a bumper, made of plastic material and intended for a motor-vehicle, said frontal piece being realized with a transversal cross section closed by the fitting of a reinforcing wall, shaped in such a way as to impart to the bumper a high degree of rigidity and, thus, imparting to it an excellent impact resistance while still preserving its slender and light structure.

It is quite well known that present bumpers of plastic material, which constitute a considerable practical improvement with respect to traditional metal bumpers, show different deficiencies as to their behaviour under impact, in as much as their generally adopted, substantially "C-shaped" form, proved to be the less suited shape for achieving a high rigidity with slim structures.

If heavy thicknesses are not used or there are not introduced many reinforcing or stiffening ribs, the open "C-shaped" profile shows a high degree of compliance under impacts suffered at an impact velocity of even only 4 km/hour, as prescribed by the ISO standards (International Organization for Standards).

So far there have been adopted different types of bumpers and front pieces of plastic material. Some of these are made in such a way as to provide prevailing an aesthetic function with a low rigidity and reduced weight. Other types of bumpers display a slender shape with internal reinforcement obtained by a metal bar or lamina limiting the excursion of the bumper, said bar having, however, the drawback of suffering a permanent set in the case of an impact.

Still other types of bumpers are substantially self-supporting in as much as they possess greater thicknesses and, thus, are of a greater weight and are mounted at a greater distance from the car body.

Thus, in general, present-day plastic bumpers, in order to have a good performance under impact, must have either a considerable weight and be mounted at a considerable distance from the body or must incorporate metal reinforcing elements which, however, after an impact maintain a permanent set.

Besides the bumpers with an open profile, of plastic or of metal, bumpers are also used with a closed or boxed profile, which bumpers obviously possess a rigidity to bending quite superior to that of the open profiles, but have various drawbacks from the point of view of aesthetics and of manufacture. In fact, only the boxed metal bumpers are easy to produce since in general they consist of simple metal tubes curved at their ends. Boxed bumpers of plastic material have not found a practical application because of considerable technological difficulties to be overcome for achieving the closed cross section in one single piece; in this case it is necessary, in general, to mold the bumper in two separate pieces and subsequently join them stably to each other. By this process the bumpers do not always turn out acceptable either from an aesthetical point of view or from a structural solidity point of view and, above all, from the view of production costs.

Thus, an object of this invention is the provision of a bumper or frontal piece of plastic material of external traditional shape but of a cross-section or profile closed in such a way as to obtain a bumper having by itself, that is, without the help of any metal supporting elements or travel-limiting elements, a sufficiently high rigidity so as to meet even the strictest standards on this matter, with low elastic sets while preserving the usual slender structure.

A further object of this invention is that of providing a bumper or frontal piece of plastic material of box-shaped type where the closing wall of the traditional open-profile bumper is so shaped as to validly resist both flexional as well as shearing stresses and strains that occur at the moment of impact, as well as to allow its application to the bumper itself or to the frontal piece by mechanical means of easy and flat application, without altering the overall dimensions and the exterior aspect of the bumper or frontal piece.

Lastly, the bumper of boxed cross-section, which is the object of this invention, is easily realized by means of standard technological moulding processes and with a considerable saving in production costs and weight.

These advantages and objects, which will appear even more clearly from the following discussion, in practice are achieved conveniently by a bumper or frontal piece for motorvehicles, of a traditional (conventional) external shape, made of plastic material and consisting, according to this invention, of a bumper or the like having an open cross-section, substantially "C"-shaped, closed on the back in a removable way, by at least one reinforcing plate or wall of variable thickness consisting of a substantially rectilinear lamina, and having at opposite ends at least one enlargement or thickening radiused according to a slanting plane with said lamina, and provided with means for the suitable anchoring of the whole reinforcement to the bumper, so as to obtain a reinforcing wall of a shape that will effectively resist the bending and shearing stresses on the supports, said reinforcing wall having along its longitudinal edges costrained coupling means or the like with as many corresponding coupling means along the edges of the bumper as are required to obtain a mechanical coupling or joint capable of ensuring the solidness of the parts with each other and at the same time capable of resisting the longitudinal stresses that always accompany the transversal stresses.

More particularly, said enlargements or thickenings at the ends of said reinforcing wall are preferably obtained by wide flarings of the terminal parts of the wall itself, said flarings being both directed towards the inside of the bumper itself and radiused to the wall according to planes with a slant of about 45° with respect to the longitudinal axis of the bumper.

The constructional characteristics and the behaviour of the plastic bumper according to the invention under an impact will now be described in further detail, according to a preferred but not exclusive form of embodiment, and with reference to the attached drawings, given for purely exemplary and not limitative purposes and in which:

FIG. 2 is a plan view, seen from the inside of a reinforcing wall achieved according to the invention;

FIG. 3 shows a cross-section of the wall of FIG. 1, taken along line A—A;

FIGS. 4 & 5 show respectively a cross-section taken along line B—B and a cross-section according to line C—C of the wall of FIG. 2;

FIG. 6 shows, on the contrary, an inner stretch of a conventional bumper, modified according to the invention;

FIG. 7 shows in a cross-section an example of coupling between reinforcing wall and bumper, while

Before describing in detail the illustrated form of embodiment, just for exemplifying purposes, in the above indicated figures, the following preliminary remarks appropriate: Since the rigidity (resistance) to bending of a boxlike section, as is known, is considerably higher than that offered by open sections of the conventional bumpers, and since this consideration cannot find a practical application in the field of bumpers given the conspicuous difficulties of a technological character to be overcome in producing closed cross-section articles, the solution suggested by this invention is that of achieving a bumper with a boxlike structure of a sure stability and solidness, by preparing separately the bumper and the suitably shaped closing rear plate and by then assembling the two parts by means of a suitably designed mechanical means.

In order to achieve by this way the best constructional solution, there was mainly studied and analyzed the behaviour of a bumper when under stress, for instance under an impact or other deforming phenomena. A bumper was thus likened to a beam resting on supports and loaded at its center point, after which there was evaluated the state of tension produced by the loading.

In such a hypothetical case, the state of tension or stress is both due to the bending moment as well as to the shearing stress; these tensions are always present in every section and to a different and varying degree, bending streses mainly occur at its centre while active shearing stresses mainly occur at the points of support. The tensions due to bending stresses, as is known to experts in the art, require a section with a high amount of inertia. This is obtained in practice by spacing the masses with respect to the neutral axis and, in the practical case by creating a beam with a boxed cross-section.

In the zones where, on the contrary, shearing stresses predominate (that is on the supporting points) the maximum tensions (that is, the direction of the main forces corresponding to the shearing stresses) act in a direction at 45° with respect to the longitudinal axis of the beam. Thus, in order to resist these tensions it is necessary to prearrange reinforcements according to the directions of the stresses themselves.

Thus the profile of the reinforcing rear wall and thus of the whole boxed bumper, which is the object of this invention, is defined on the basis of the above considerations.

Figure 1:
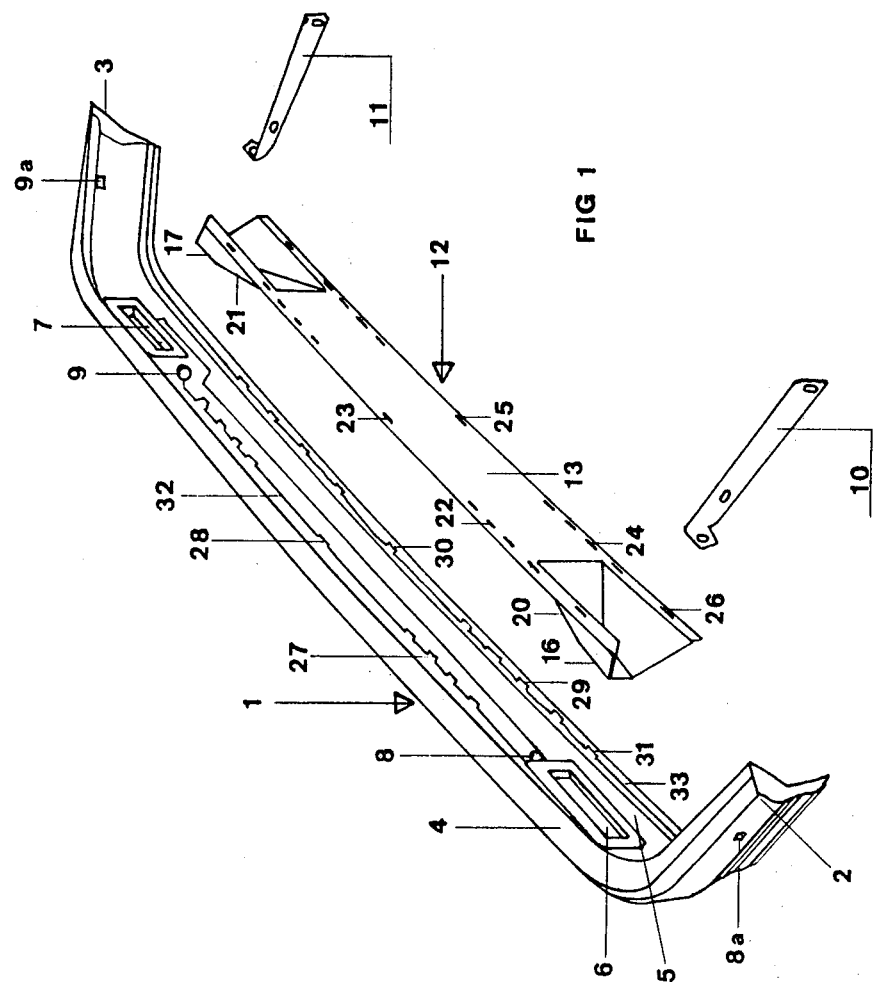
FIG. 1 represents a perspective view of a boxed bumper, realized according to this invention and shown in an exploded view, that is, with the rear reinforcing wall separated from the bumper body.

With reference to the above cited figures, the boxed bumper, of this invention, is thus substantially formed by a bumper (1) of plastic material, structured and shaped in a known conventional way, that is with an open section substantially "C"-shaped, with the ends 2 and 3 bent through about 90° and with the upper wing 4 and lower wing 5 substantially parallel to each other. Furthermore, bumper (1) is provided with openings 6 and 7 for the supporting of the front position lights and with the usual holes or apertures 8–9 and 8a–9a for its anchoring by means of brackets 10–11 and others not represented (FIG. 1), to the frame of the motorvehicle.

The closing of the open section of the bumper (1) is achieved, according to the invention, by the application (in a removable way) of a rear reinforcing wall generally marked 12, made of plastic material like that of the bumper, or also of a metal material or other suitable material.

Reinforcing wall 12 is shaped in such a way so as to resist, when applied on the rear of the bumper 1, both flexional or bending stresses as well as shearing forces, and for that purpose it consists of a flat, rectilinear plate 13, slightly arched like the bumper, and strengthened by two longitudinal ribs 14–15, and having at its opposite ends a wide flaring forming respectively projections 16 and 17, whose height is substantially equal to the depth of the hollow zone of bumper 1. On the head of the projections 16 and 17 there are provided holes 18–19 which, when reinforcing wall 12 is placed frontally in contact with the wings 4 and 5 of the bumper, will place themselves in line with the axis of holes 8–9 of the bumper itself.

Projections 16 and 17 are made in such a way as to be radiused to the rectilinear surface 13 of plate 12 according to a slanting (inclined) plane 20, and, respectively, 21, each one with an acute angle with respect to the longitudinal axis of the bumper, and this in as much as already said, the projections 16 and 17 are called to resist maximum shearing stresses that are acting on the fixing points of the bumper when it is subject to a stress.

Reinforcing wall 12 is, moreover, provided along its opposite, arched longitudinal borders with slots 22, 23, 24, 25, 26, etc., distributed over the whole length of the wall itself and having the function of fixed engaging means, with the corresponding teeth or projections 27–28–29–30–31 etc., provided on the wings 4 and 5 of the bumper and directed perpendicularly to the plane of reinforcing wall 12.

Teeth 27–28–29 etc. are preferably obtained, in the case of conventional bumpers, by providing either a supplementary wing running longitudinally to each one of wings 4 and 5 of the bumper or by providing two longitudinal, substantially 'V'-shaped, grooves 32–33 (see FIGS. 1–6–7) and by suitably indenting the lower border 32a of the upper V-shaped groove in order to obtain upper teeth 27–28 etc. and, respectively, by indenting the more internal upper border 33a of the groove of lower wing 5, in order to obtain the lower teeth 29, 30, 31 etc. In this way the external surfaces in view of wings 4 and 5 of the bumper remain intact while the reinforcing wall 12 remains closed in between the wings themselves, as is clearly evidenced in the cross-section of FIG. 7.

The reinforcing wall thus structured may, thus, be used for closing the rear of the bumper by inserting the slots on the teeth of the bumper and by then blocking it on the brackets of the bumper through holes 18–19 of projections 16–17.

In the case of an impact or of any other type of stress, the boxed bumper according to this invention, although showing the reinforcing wall not rigidly welded along the borders of the bumper itself, is still capable of resisting even high bending strains and shearing stresses without suffering permanent sets.

Thus, taking into account the nature and extent of the stresses (which may at any rate be calculated to a good approximation according to the known theoretical teachings) there has been obtained according to the invention an optimal configuration of the reinforcing wall as well as an arrangement and dimensioning of the fixing elements of the same to the bumper, suitable for bumpers of plastic material with a reinforcing wall likewise made of plastic material or else, if so desired, made of metal.

According to another form of embodiment, likewise falling within the inventive scope of this invention, said reinforcing wall may be provided with a plurality of projections 16–17, distributed on the inner wall of the bumper, in case the dimensions and requirements of operation of the bumper should require them.

Figure 8:
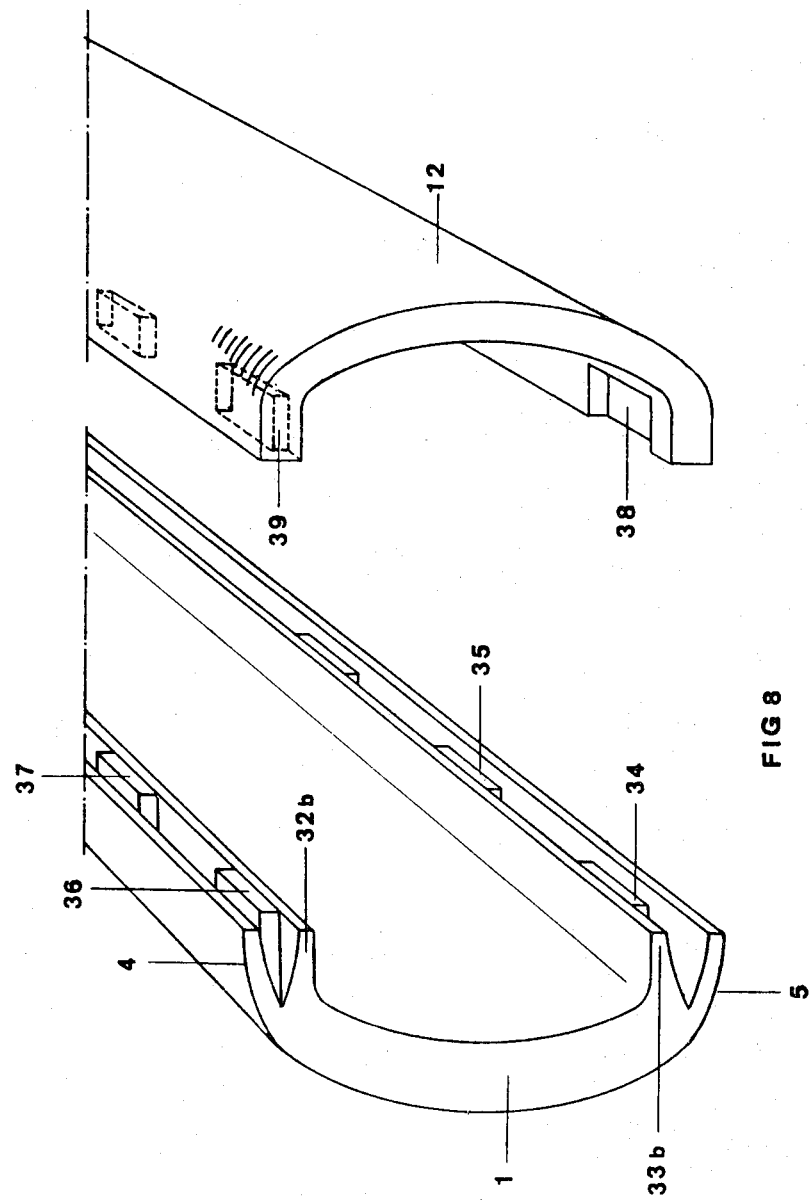
FIG. 8 represents a perspective view of a variant of the invention.

According to another form of embodiment of the invention, for the coupling of the longitudinal borders of the wall with the borders of the bumpers, there are provided (see FIG. 8), inside the V-shaped grooves of the bumper, a plurality of prismatic projections 34, 35 etc. solid with the inner wall of border 33b of wing 5 and an equal number of prismatic projections 36–37 etc. solid with the lower border 32b of wing 4, while along the longitudinal borders of wall 12 are provided cavities 38, 39 etc. suitable for being fitted onto the corresponding prismatic projections present in the V-shaped grooves of the bumper.

Also this solution, easily achievable during the moulding stages of the bumper, allows a rigid connection between the parts and, at the same time, allows the reinforcing wall, once it has been coupled with the bumper, to also form a conforming rigid element for the whole bumper, that is, a reinforcing and alignment element for the horizontal alignment of the wings of the bumper which, as is known, tend in the course of time to develop undesirable bucklings and/or deformations.

Obviously, to the invention as herein above described, according to a preferred form of embodiment, there may be practically introduced further structurally and functionally equivalent modifications and variants, without thereby falling outside the protective scope of the invention itself. Thus, for instance, the reinforcing wall, besides being made of plastic material may also be made of metal and/or metal alloys or of any other suitable material, while the number of projections and the angle of radiused connection with the wall may vary according to applicational requirements, while the reinforcing wall thus shaped may be used, besides as a fourth wall for bumpers, also for the closing up of open sections of frontal pieces for motorcars in general and of those of other similar manufactured articles subjected to deformation under impact and/or for other reasons.

What we claim is:

1. A bumper for a motor-vehicle having a box-shaped cross-section, comprising an elongated bumper member made of plastics material and having an open cross-section substantially shaped like a "C", said bumper member being closed in the rear by one removable reinforcing wall comprising a substantially rectilinear lamina having at each end one enlargement radiused to the plane of the lamina by means of a slanting plane and provided with transversal holes for a stable anchoring of the reinforcing wall to the bumper member and to the motor-vehicle, said reinforcing wall having along its longitudinal borders first coupling means which are engageable with corresponding second coupling means provided along the opposite longitudinal borders of the bumper member, said first and second coupling means providing a solid joining of the bumper member and reinforcing wall.

2. A bumper according to claim 1, in which said enlargements at the ends of the reinforcing wall consist of wide flarings of the ends of the wall itself, said flarings being directed towards the inside of the bumper member and being radiused to the central section of the wall according to slanting planes inclined at an angle up to 45° with respect to the longitudinal axis of the bumper member.

3. A bumper according to claim 1, in which said transversal holes for anchoring the reinforcing wall to the bumper member are provided in a head of each enlargement, at a position corresponding to fixing holes for fixing the bumper member to supporting brackets, said transversal holes being so configured as to allow the fastening of the reinforcing wall to the supporting brackets of the bumper member.

4. A bumper according to claim 1, in which said first coupling means comprises slots arranged along the borders of the reinforcing wall and said second coupling means comprises teeth arranged along the borders of the bumper member, the coupling between said slots and teeth being located partially inside a hollow body of the bumper member so that said reinforcing wall remains closed in a cavity of the bumper member between the borders of the same, said bumper member having upper and lower parallel wings and said teeth being obtained by indenting internal borders of said upper and lower wings.

5. A bumper according to claim 4, in which said first and second coupling means comprise prismatic projections arranged on inner wings of longitudinal V-shaped grooves running inside the borders of the bumper member and corresponding indents made in a head of the borders of said reinforcing wall.

6. A bumper according to claim 1, in which said resilient wall is made of plastics material.

* * * * *